(12) United States Patent
Kodama et al.

(10) Patent No.: US 7,051,000 B2
(45) Date of Patent: May 23, 2006

(54) ELECTRONIC PURCHASE SYSTEM AND METHOD THEREOF

(75) Inventors: Michiteru Kodama, Kawasaki (JP); Hiroaki Matsuo, Kawasaki (JP); Yasuo Noshiro, Kawasaki (JP); Katsuro Saito, Kawasaki (JP); Yutaka Akimoto, Kawasaki (JP); Teruo Mizutani, Kawasaki (JP); Hideyuki Takahashi, Yatsuo Machi (JP); Yuichi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 714 days.

(21) Appl. No.: 09/729,950

(22) Filed: Dec. 6, 2000

(65) Prior Publication Data

US 2001/0005835 A1 Jun. 28, 2001

(30) Foreign Application Priority Data

Dec. 27, 1999 (JP) ................................ 11-369035

(51) Int. Cl.
*G06F 17/60* (2006.01)

(52) U.S. Cl. .......................................... 705/37; 705/35
(58) Field of Classification Search ................ 705/37, 705/26, 27
See application file for complete search history.

(56) References Cited

U.S. PATENT DOCUMENTS

| 4,594,663 | A | * | 6/1986 | Nagata et al. ................. 705/17 |
| 5,710,887 | A | * | 1/1998 | Chelliah et al. ............... 705/26 |
| 5,842,178 | A | * | 11/1998 | Giovannoli ................... 705/26 |
| 5,878,400 | A | | 3/1999 | Carter, III ..................... 705/20 |
| 5,924,082 | A | * | 7/1999 | Silverman et al. ............ 705/37 |
| 5,924,083 | A | * | 7/1999 | Silverman et al. ............ 705/37 |
| 6,055,573 | A | * | 4/2000 | Gardenswartz et al. ..... 709/224 |
| 6,078,897 | A | * | 6/2000 | Rubin et al. ................... 705/14 |
| 6,161,099 | A | * | 12/2000 | Harrington et al. ........... 705/37 |
| 6,226,624 | B1 | * | 5/2001 | Watson et al. ................ 705/44 |
| 6,317,727 | B1 | * | 11/2001 | May ............................. 705/37 |
| 6,598,027 | B1 | * | 7/2003 | Breen et al. ................... 705/26 |
| 6,606,608 | B1 | * | 8/2003 | Bezos et al. ................... 705/37 |
| 6,687,682 | B1 | * | 2/2004 | Esfandiari et al. ............ 705/37 |
| 2002/0049631 | A1 | * | 4/2002 | Williams ..................... 705/14 |
| 2003/0097325 | A1 | * | 5/2003 | Friesen et al. ................ 705/37 |

FOREIGN PATENT DOCUMENTS

| JP | 10-149406 | 6/1998 |
| JP | 10-261026 | 9/1998 |
| JP | 11-7467 | 1/1999 |
| JP | 11-53428 | 2/1999 |

OTHER PUBLICATIONS

Munday, M., Buyer-Supplier Partnerships and Cost Data Disclosure, Management-Accounting- London, v70n6 Jun. 1992, 4 pages.*

(Continued)

*Primary Examiner*—Charles R. Kyle
(74) *Attorney, Agent, or Firm*—Staas & Halsey LLP

(57) ABSTRACT

A purchasing company registers selling companies with which she does not want to trade in a setting management unit, and a selling company registers purchasing companies with which she does not want to trade in the setting management unit. The registration information is stored in a selling company/purchasing company table. An electronic catalog is made public only to purchasing companies with which the selling company permits trade. A transaction unit makes an estimate request received from a purchasing company public only to selling companies with which the purchasing company permits trade.

10 Claims, 23 Drawing Sheets

OTHER PUBLICATIONS

TRILOGY™, Enterprise Class E-Business Solutions, www.trilogy.com/products/products.asp.

Notice of Rejections for Japanese Patent Application No. 11-369035 mailed May 17, 2005.

* cited by examiner

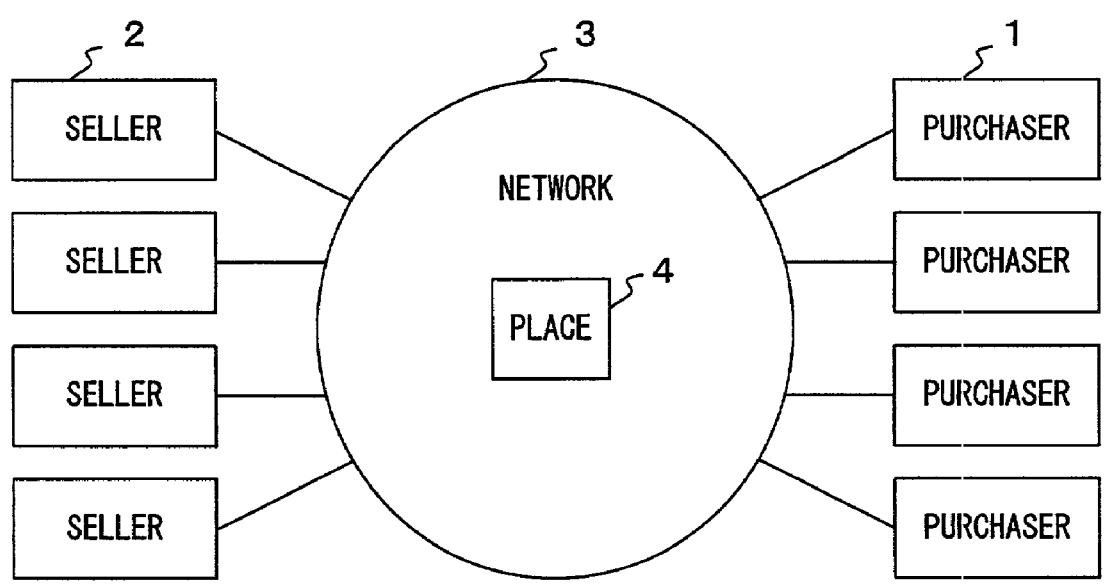
F I G. 1

| USER ID | PASSWORD | COMPANY ID | CLASS OF MANAGER | ..... |
|---|---|---|---|---|
| a0000001 | xyz | K102 | ORDINARY | |
| b0000012 | abc | K103 | ORDINARY | |
| c0000003 | bbb | K104 | ORDINARY | |
| ... | | | | |
| a0000004 | xxx | H567 | ORDINARY | |
| b0000007 | aca | H300 | ORDINARY | |
| ... | | | | |

FIG. 3

| COMMODITY NUMBER | ITEM | STANDARD PRICE | ..... |
|---|---|---|---|
| KY000001 | NOTEBOOK | 1 0 0 | |
| KY000002 | NOTEBOOK | 1 2 0 | |
| KY000003 | NOTEBOOK | 1 5 0 | |
| ⋮ | | | |
| KX000001 | ERASER | 5 0 | |
| ⋮ | | | |

F I G. 4

| COMMODITY NUMBER | SELLING COMPANY ID | PURCHASING COMPANY ID | SELLING PRICE | DELIVERY TIME | ..... |
|---|---|---|---|---|---|
| KY0000001 | H567 | K102 | 93 | 3 DAYS | |
| KY0000001 | H567 | K103 | 105 | 4 DAYS | |
| KY0000001 | H300 | K102 | 92 | 7 DAYS | |
| KY0000002 | H567 | K102 | 45 | 5 DAYS | |
| ......... | | | | | |

FIG. 5

| SELLING COMPANY ID | PURCHASING COMPANY ID | SELLING COMPANY PERMISSION FLAG | PURCHASING COMPANY PERMISSION FLAG |
|---|---|---|---|
| H700 | K200 | Y (PERMITTED) | Y |
| H700 | K201 | N (NOT PERMITTED) | Y |
| H700 | K202 | N | N |
| ⋮ | | | |
| H701 | K200 | Y | Y |
| H701 | K201 | Y | Y |
| H701 | K202 | N | Y |
| ⋮ | | | |

FIG. 6

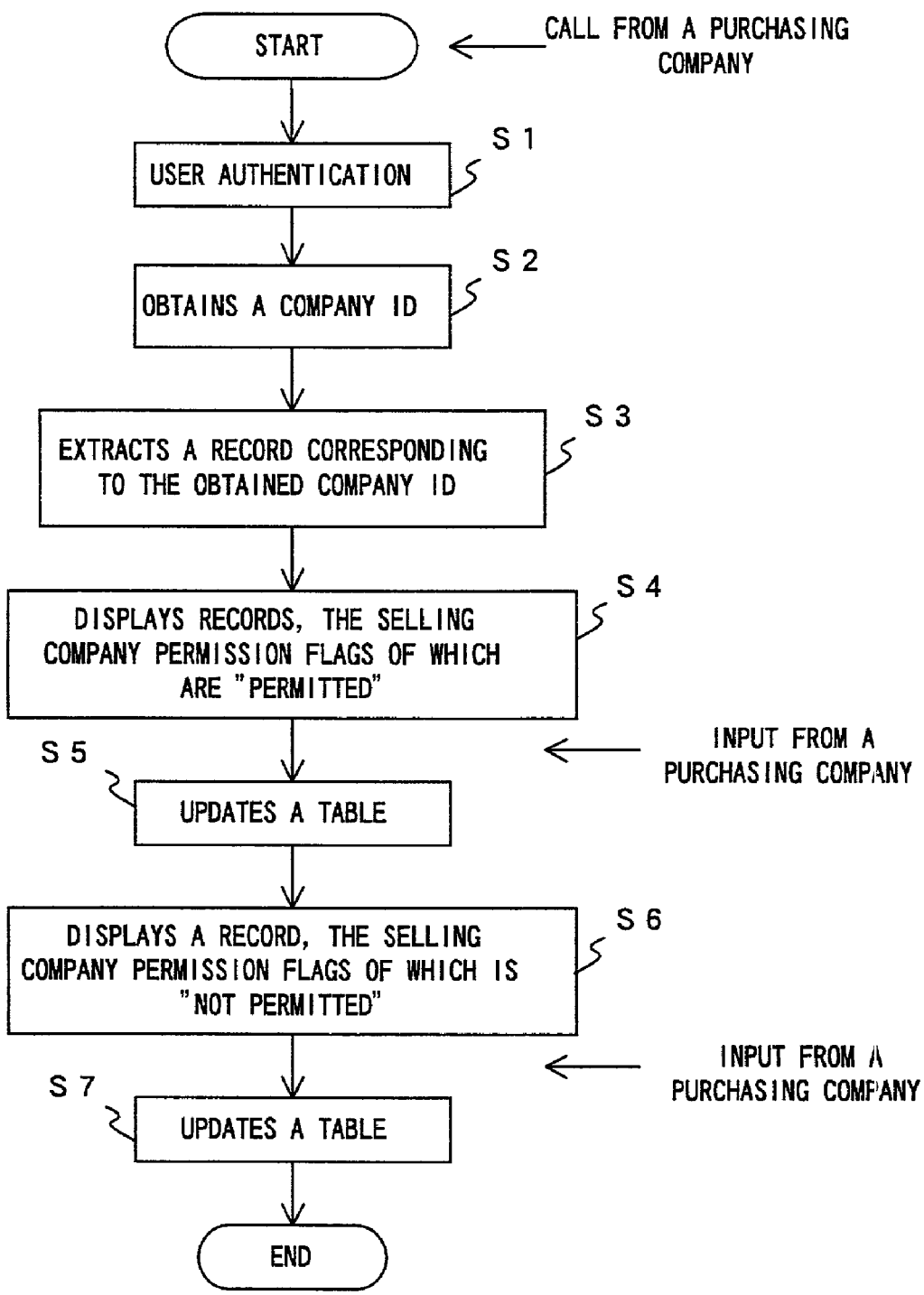
F I G. 7

| SELLING COMPANY ID | PURCHASING COMPANY ID | SELLING COMPANY PERMISSUON FLAG | PURCHASING COMPANY PERMISSUON FLAG |
|---|---|---|---|
| H700 | K200 | Y | Y |
| H701 | K200 | N | Y |
| H702 | K200 | N | N |
| H703 | K200 | Y | Y |
| H704 | K200 | Y | N |
| H705 | K200 | N | N |

FIG. 8A

| SELLING COMPANY ID | PURCHASING COMPANY ID | SELLING COMPANY PERMISSUON FLAG | PURCHASING COMPANY PERMISSUON FLAG |
|---|---|---|---|
| H700 | K200 | Y | Y |
| H703 | K200 | Y→N | Y |
| H704 | K200 | Y | N |

FIG. 8B

| SELLING COMPANY ID | PURCHASING COMPANY ID | SELLING COMPANY PERMISSUON FLAG | PURCHASING COMPANY PERMISSUON FLAG |
|---|---|---|---|
| H701 | K200 | N | Y |
| H702 | K200 | N | N |
| H705 | K200 | N→Y | N |

FIG. 8C

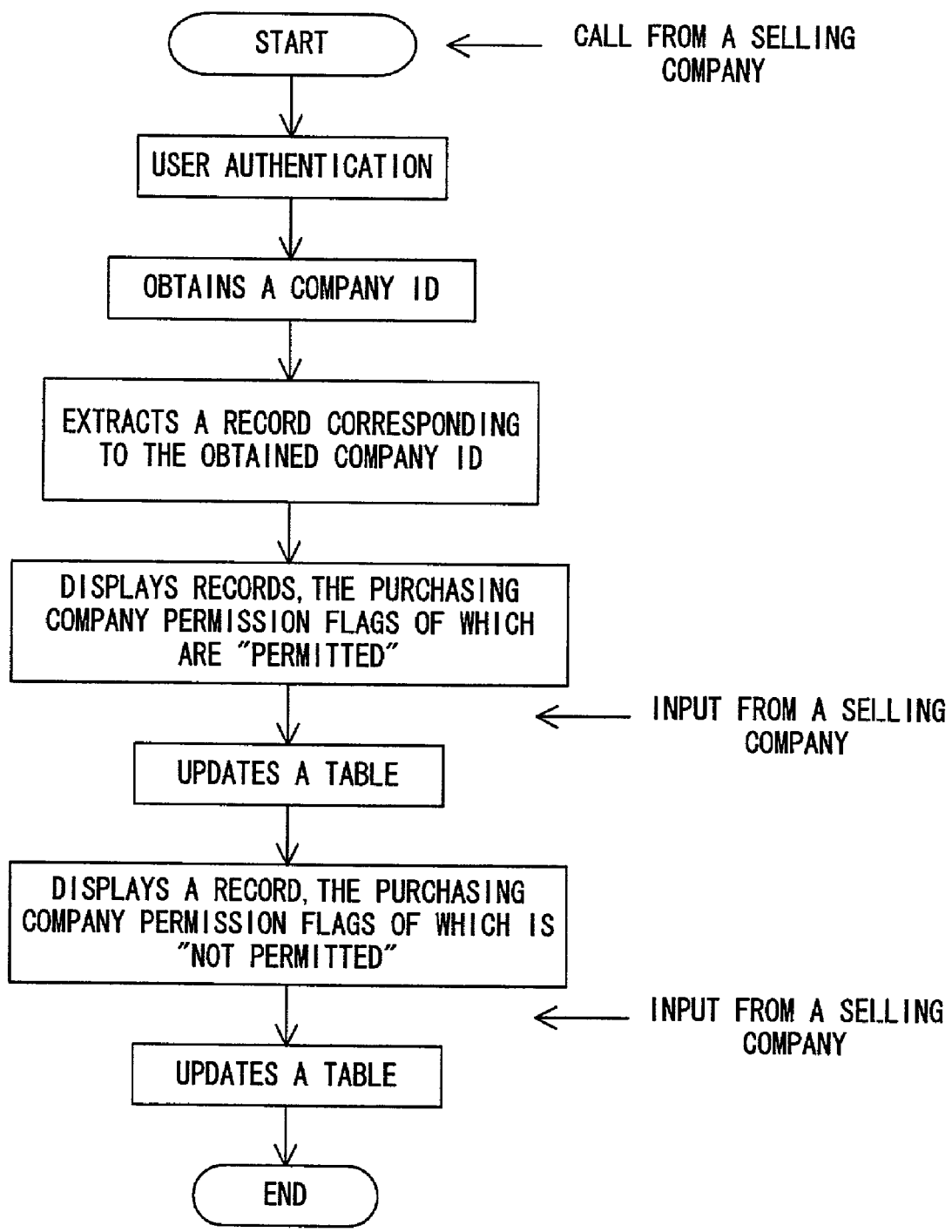
F I G. 9

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 567 | K 103 | 105 | 4 DAYS |

FIG. 11A

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 567 | K 103 | 105 | 4 DAYS |
| K Y 0000001 | H 567 | K 104 | 98 | 4 DAYS |

FIG. 11B

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 567 | K 103 | 100 | 4 DAYS |

FIG. 11C

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |

FIG. 11D

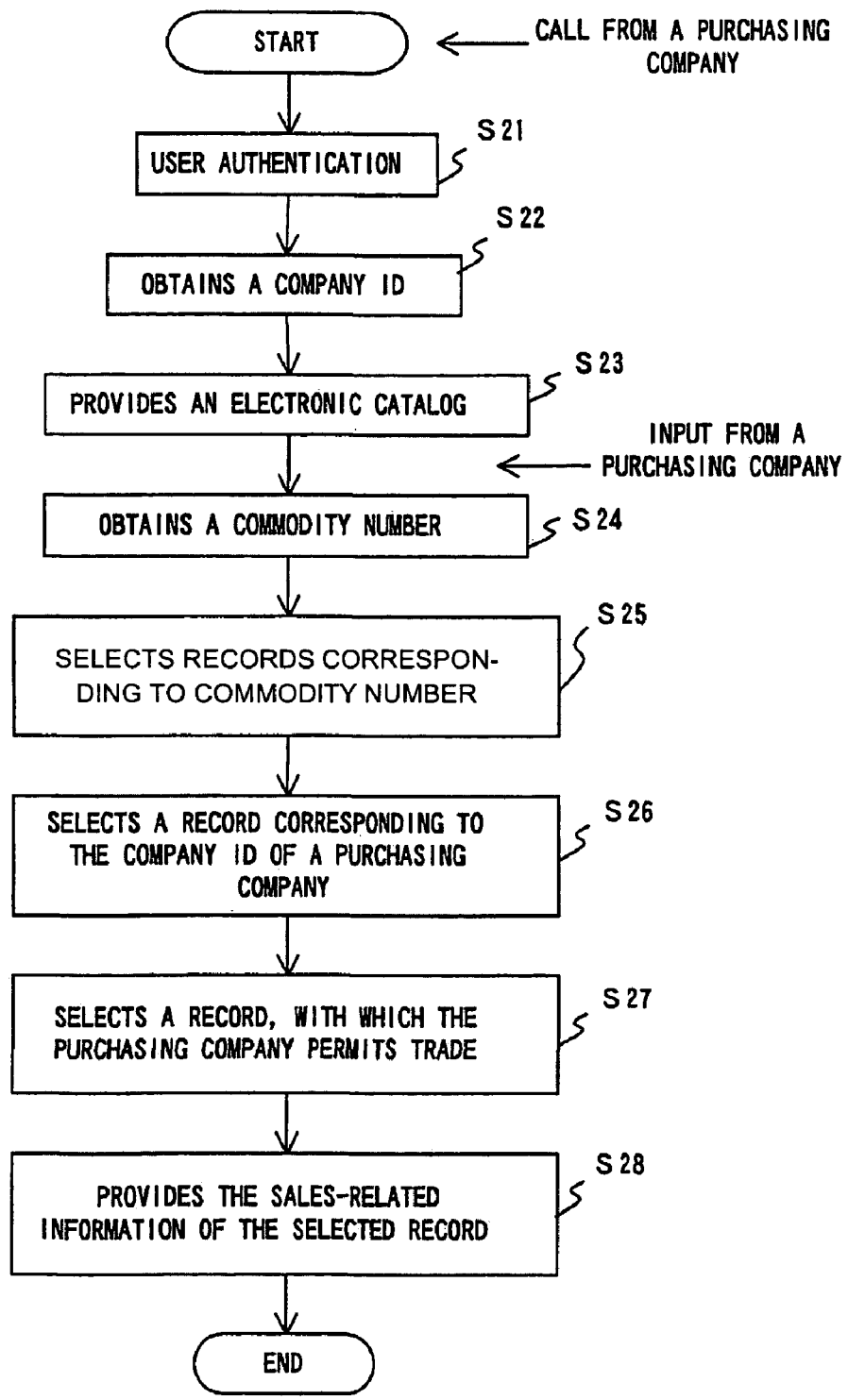
F I G. 1 2

☑ COMMODITY NUMBER : K Y0000001
　ITEM : NOTEBOOK
　STANDARD PRICE : 100
　PHYSICAL INFORMATION : A4  30 PAGES

DISPLAY SALES-RELATED INFORMATION?

| YES | NO |

F I G. 1 3

DISPLAY OF SALES-RELATED INFORMATION

NAME OF PURCHASING COMPANY : ADVERTISEMENT AGENT Z
ITEM : NOTEBOOK
STANDARD PRICE : 100
PHYSICAL INFORMATION : A4  30 PAGES
PLACE OF DELIVERY : CHIBA PREFECTURE

| NAME OF SELLIG COMPANY | PRICE | TIME OF DELIVERY | REMARKS |
|---|---|---|---|
| TRADE COMPANY A | 9 3 | 3 DAYS | |
| TRADE COMPANY B | 9 2 | 7 DAYS | |

F I G.  1 4

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 567 | K 103 | 105 | 4 DAYS |
| K Y 0000001 | H 300 | K 102 | 92 | 7 DAYS |
| K Y 0000001 | H 313 | K 102 | 97 | 5 DAYS |
| K Y 0000001 | H 313 | K 103 | 96 | 5 DAYS |
| K Y 0000002 | H 684 | K 102 | 99 | 4 DAYS |
| ⋮ | | | | |

F I G. 1 5 A

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 567 | K 103 | 105 | 4 DAYS |
| K Y 0000001 | H 300 | K 102 | 92 | 7 DAYS |
| K Y 0000001 | H 313 | K 102 | 97 | 5 DAYS |
| K Y 0000001 | H 313 | K 103 | 96 | 5 DAYS |

F I G. 1 5 B

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 300 | K 102 | 92 | 7 DAYS |
| K Y 0000001 | H 313 | K 102 | 97 | 5 DAYS |

F I G. 1 5 C

| COMMIDITY NUMBER | SELLING COMPANY ID | PURCHASING COMPANY ID | SELLING PRICE | DELIVERY TIME |
|---|---|---|---|---|
| K Y 0000001 | H 567 | K 102 | 93 | 3 DAYS |
| K Y 0000001 | H 300 | K 102 | 92 | 7 DAYS |

F I G. 1 5 D

```
ESTIMATE REQUEST SLIP

NAME OF PURCHASING COMPANY : ADVERTISEMENT AGENT Z
ITEM : NOTEBOOK
STANDARD PRICE : 100
PHYSICAL INFORMATION : A4  30 PAGES
PLACE OF DELIVERY : CHIBA PREFECTURE
```

FIG. 17A

```
ESTIMATE REPLY SLIP

NAME OF PURCHASING COMPANY : ADVERTISEMENT AGENT Z
ITEM : NOTEBOOK
STANDARD PRICE : 100
PHYSICAL INFORMATION : A4  30 PAGES
PLACE OF DELIVERY : CHIBA PREFECTURE
PRICE : 91 YEN
TIME OF DELIVERY : 7 DAYS
NAME OF SELLING COMPANY : TRADE COMPANY C
VALID : FOR 3 MONTHS
```

FIG. 17B

```
PURCHASE REQUEST SLIP

NAME OF PURCHASING COMPANY : ADVERTISEMENT AGENT Z
ITEM : NOTEBOOK
STANDARD PRICE : 100
PHYSICAL INFORMATION : A4  30 PAGES
PLACE OF DELIVERY : CHIBA PREFECTURE
DESIRED PRICE : 90 YEN
TIME OF DELIVERY : 5 DAYS
```

F I G. 1 8

| SELLING COMPANY ID | PURCHASING COMPANY ID | DATE OF TRADE | TRADE AMOUNT |
|---|---|---|---|
| H567 | K102 | 1999-12-11 | 6,500 |
| H567 | K102 | 1999-12-11 | 3,000 |
| H300 | K102 | 1999-12-11 | 1,000 |
| H567 | K103 | 1999-12-12 | 4,000 |
| | | | |

FIG. 20

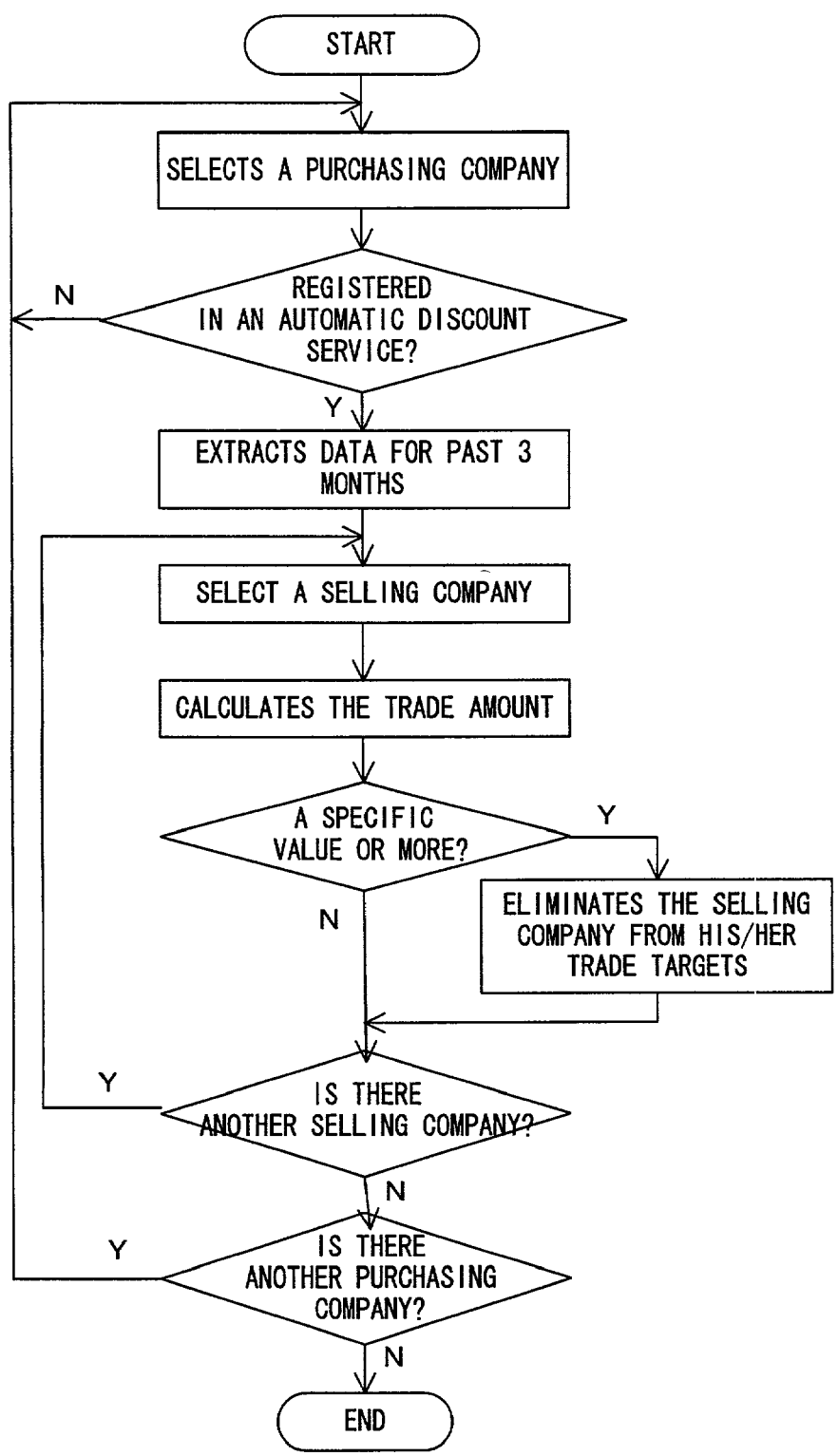
F I G. 2 1

ELECTRONIC PURCHASE SYSTEM AND METHOD THEREOF

BACKGROUND OF THE INVENTION

1. Field of the Invention

The present invention relates to a system for trading commodities including services using a network.

2. Description of the Related Art

Recently a variety of commodities including services have been traded using a network. Hereinafter, a system for trading commodities using a network is called an "electronic purchase system".

Although a network used in an electronic purchase system is not restricted, for example, it can be the "Internet". An electronic purchase system using the Internet is described below.

A seller of commodities, for example, displays a "catalog of commodities" on the home page of the seller. Generally the catalog includes the list of commodities that the seller can offer and the price of each commodity. A purchaser browses the home page of the seller and selects (purchases) his/her favorite commodity from the catalog. If the seller recognizes that the purchaser has selected a specific commodity from the catalog, the seller provides the purchaser with the commodity.

The electronic purchase system described above presumes that one or more purchasers select commodities from a catalog of a specific seller. However, a system where a purchaser can select commodities from the catalogs of a plurality of sellers is also known. Such a system can be implemented, for example, by displaying catalogs provided by a plurality of sellers on one specific home page. In this case, this home page may be provided by the sellers or may be a person other than the sellers. The catalog of each seller is often edited in such a way that a purchaser can easily view it. In this way, a purchaser can select his/her favorite commodities from a plurality of catalogs.

As described above, a system for trading commodities using a network, in particular using the Internet, is conventionally known.

However, according to the conventional electronic purchase system, usually purchasers and/or sellers are not restricted. Specifically, a purchaser cannot restrict his/her sellers while a seller also cannot restrict his/her purchasers. This leads to the following situations.

If there are many and unspecified purchasers, there is a high possibility that a purchase price may not be paid or the payment may be delayed. This creates a high risk in price collection. For this reason, a seller often hopes to restrict his/her purchasers.

When a trade agreement is made between a seller and a purchaser, an account must be opened. Specifically, if a purchaser wants to trade with many sellers, he/she must open an account for each seller and manage the account, which increases his/her incidental burden. A problem often occurs, for example, in a case where a purchaser is an enterprise and a person who purchases a commodity, such as each employee, etc., and a person who manages the purchase of commodities, such as stuff in a general-affairs department, etc., are different. For this reason, a purchaser, in particular a person who manages the purchase of commodities, often hopes to restrict his/her sellers.

As a solution to such a problem, for example, the use of a credit card company can be considered. If a credit card company is used, there is no need to open an account for each trade partner and the risk of price collection can also be reduced. However, in this case, a commission, etc., must be paid to the credit card company. Therefore, an expense increase occurs.

According to the conventional electronic purchase system, the selling price of each commodity is basically fixed for all purchasers. However, in the real world, for example, generally a selling price is discounted for both a regular purchaser and a heavy purchaser or the price is modified depending on the location of a purchaser. Specifically, the conventional electronic purchase system cannot realize trade conducted in the real world.

There is also a system where the price of a commodity can be fixed for each purchaser using a network. For example, a car selling system where the selling price of a car can be fixed by inputting data on the model, the color of a car body, the existence/non-existence of options, is known. However, this system is a tool for a sales person, and a plurality of sellers and a plurality of purchasers cannot participate in this system.

SUMMARY OF THE INVENTION

It is an object of the present invention to provide an electronic purchase system that provides a place where a plurality of sellers and/or a plurality of purchasers can interact and where a seller can restrict his/her purchasers or a purchaser can restrict his/her sellers. It is another object to modify the selling price of a commodity for each purchaser in the electronic purchase system described above.

This electronic purchase system of the present invention provides a place where a seller and a plurality of purchasers can participate. The system comprises a storage unit storing sales-related information about commodities offered by the seller, a purchaser registration unit registering one or more of the plurality of purchasers according to the instruction of the seller, and a publication un it making public the sales-related information only to purchasers registered by the purchaser registration unit.

According to the configuration, the sales-related information is made public only to purchasers designated by the seller. In other words, the sales-related information is not made public to purchasers whom the seller eliminates from his/her trade targets. Therefore, the seller can trade only with purchasers who he/she designates. In other words, the seller can eliminate trades with inappropriate purchasers.

Another electronic purchase system of the present invention provides a place where a purchaser and a plurality of sellers can interact. The system comprises a seller registration unit registering one or more of the plurality of sellers according to the instruction of the purchaser, a reception unit receiving a request on the trade of a commodity from the purchaser, and a publication unit making public the request only to sellers registered by the seller registration unit.

According to the configuration, a request on the trade of a commodity, such as an estimate request, a purchase request, etc., is made public only to sellers who the purchaser designates. In other words, the request is not made public to sellers whom the purchaser eliminates from his/her trade targets. Therefore, the purchaser can trade only with sellers whom the purchaser designates. In other words, the purchaser can eliminate trades with inappropriate sellers.

Another electronic purchase system in the present invention provides a place where a seller and a plurality of purchasers can interact. The system comprises a storage unit storing individually set sales-related information about commodities that the seller can offer to one or more of the plurality of purchasers and a publication unit making public the sales-related information to the plurality of purchasers.

According to the configuration, a seller individually sets sales-related information that is made pubic to each purchaser, for each purchaser. In this way, a trade form close to the real world can be realized.

BRIEF DESCRIPTIONS OF THE DRAWINGS

FIG. 1 shows the configuration of the electronic purchase system in one embodiment of the present invention.

FIG. 3 shows an example of a user management table.

FIG. 4 shows an example of a commodity management table.

FIG. 5 shows an example of a sales management table.

FIG. 6 shows an example of a selling company/purchasing company table.

FIG. 7 is a flowchart showing the process of a network central system executed when a purchasing company restricts trades with selling companies.

FIGS. 8A–8C show examples of cases where a purchasing company restricts trades with selling companies.

FIG. 9 is a flowchart showing the process of a network central system executed when a selling company restricts trades with purchasing companies.

FIGS. 11A–11D show examples of cases where a selling company adds, modifies or deletes sales-related information.

FIG. 12 is a flowchart showing the process of a network central system executed when an electronic catalog is delivered to a purchasing company.

FIG. 13 shows an example of the display of an electronic catalog (No. 1).

FIG. 14 shows an example of the display of an electronic catalog (No. 2).

FIGS. 15A–15D show examples of the processes of preparing an electronic catalog displayed to purchasing companies.

FIG. 17A shows an example of an estimate request slip.

FIG. 17B shows an example of an estimate reply slip.

FIG. 18 shows an example of a purchase request.

FIG. 20 shows an example of a trade log table.

FIG. 21 is a flowchart showing the operation of a network central system to provide the service of modifying a trade target based on a trade amount.

DESCRIPTION OF THE PREFERRED EMBODIMENTS

Figure 2:
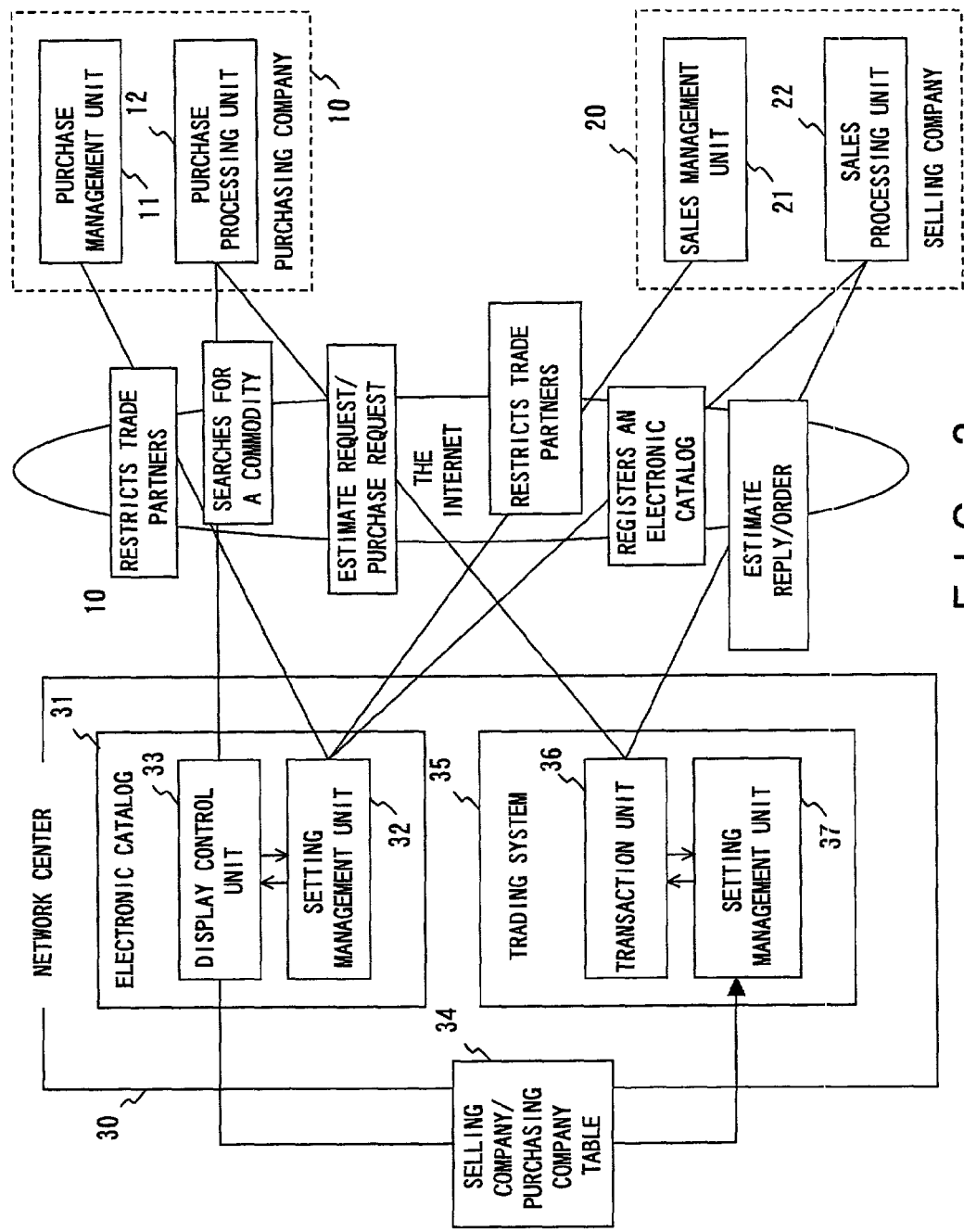
FIG. 2 shows the configuration of the electronic purchase system in the embodiment.

FIG. 1 shows the configuration of the electronic purchase system in one embodiment of the present invention. According to the electronic purchase system in this embodiment, a plurality of purchasers 1 and a plurality of sellers 2 are connected to a network 3. In this case, each of the purchaser 1 and seller 2 can be an enterprise or an individual. In the network 3, a place 4 where each of the purchaser 1 and seller 2 can interact is provided. The place 4 is provided, for example, at a specific site in the network (a specific computer accommodated in the network 3). Each of the purchaser 1 and seller 2 is provided with an information communication terminal in order to access the place 4.

In the configuration described above, although the network 3 is not especially restricted, it is, for example, the "Internet". If the network 3 is the Internet, the place 4 is, for example, a home page, and each of the purchaser 1 and seller 2 accesses and browses information made public in the place 4 using a browser.

FIG. 2 shows the configuration of the electronic purchase system in the embodiment. In this example it is assumed that the network 3 shown in FIG. 1 is the Internet. It is also assumed that the seller and purchaser both are enterprises (companies).

The electronic purchase system in this embodiment provides a "place" for an electronic trade where there are a plurality of selling companies (enterprises on a selling side) and a plurality of purchasing companies (enterprises on a purchasing side). In this "place", displaying and browsing of an electronic catalog, requesting an estimate for a commodity, replying to the request, and purchasing of the commodity are realized. It is each employee of a purchasing company that actually purchases a commodity or issues an estimate request.

The manager of a purchasing company can restrict selling companies. Each employee of the purchasing company can transmit an estimate request or a purchase request only to selling companies to which the manager permits transmission. In this way, the purchasing company can specify a trade partner and can reduce the variety of labor required.

The manager of a selling company can restrict purchasing companies. In this way, purchasing companies that the selling company eliminates as his/her trade targets cannot read the electronic catalog of the selling company. The selling company can also individually set a selling price for each of the purchasing companies with which the manager permits trade.

In FIG. 2, a purchasing company 10 and a selling company 20 correspond to the purchaser 1 and seller 2 in FIG. 1, respectively. Both the purchasing company 10 and selling company 20 comprise one or more information communication terminals that can access the Internet and that can browse home pages (for example, a computer provided with a communication function). In FIG. 2, actually both a plurality of purchasing companies 10 and a plurality of selling companies 20 are connected to the Internet, although they are omitted to simplify FIG. 2.

A network central system 30 corresponds to the information processing device (for example, a server computer) for providing the place 4 shown in FIG. 1. In this example, the "place" is, for example, a home page that the purchasing company 10 and the selling company 20 can browse.

The purchasing company 10 comprises a purchase management unit 11 and a purchase processing unit 12. Both the purchase management unit 11 and purchase processing 12 are installed in one or more information communication terminals provided in the purchasing company 10. A browser is installed in this information communication terminal to browse home pages.

The purchase management unit 11 notifies the network central system 30 of an instruction to select a trade partner based on a user's input. In this case, a user who inputs information to the purchase management unit 11 is, for example, an employee belonging to the general-affairs department of the purchasing company. The "selection of a trade partner" is a process of selecting one or more of the plurality of selling companies.

The purchase processing unit 12 searches for a desired commodity in an electronic catalog registered in the network central system 30 based on a user's input, or transmits an estimate request or a purchase request to a "place" provided by the network central system 30. A user who inputs information to the purchase processing unit 12 is basically each employee of the purchasing company.

The selling company 20 comprises a sales management unit 21 and a sales processing unit 22. Both the sales management unit 21 and the sales processing 22 are installed in one or more information communication terminals provided in the selling company 20. A browser is installed in this information communication terminal to browse home pages.

The sales management unit 21 notifies the network central system 30 of an instruction to select a trade partner based on a user's input. In this case, a user who inputs information to the sales management unit 21 is, for example, an employee belonging to the general-affairs department of the selling company. The "selection of a trade partner" is a process of selecting one or more of the plurality of purchasing companies.

The sales processing unit 22 registers an electronic catalog in the network central system 30 based on a user's input. Here, in this electronic catalog, different conditions (price, delivery time, etc.) can be set for each purchaser. In addition, the sales processing unit 22 transmits a reply to the estimate request or purchase request to a "place" provided by the network central system 30. A user who inputs information to the sales processing unit 22 is basically each employee of the selling company.

The network central system 30 comprises an electronic catalog system 31 and a trading system 35, and provides a "place" where a purchasing company 10 and a selling company 20 trade with each other. Specifically, a place where a selling company 20 registers an electronic catalog, a place where an electronic catalog is made public to a purchasing company 10, a place where an estimate request or purchase request is received from the purchasing company 10, and a place where a reply to the estimate request or purchase request is received from the selling company 20, are provided.

The electronic catalog system 31 comprises a setting management unit 32 and a display control unit 33. The electronic catalog system 31 stores an electronic catalog registered by the selling company 20 and makes public the electronic catalog, after editing it if required. Specifically, the setting management unit 32 receives a catalog to be registered by the selling company 20 and stores the catalog in a storage device. In addition, the setting management unit 32 receives instructions related to the selection of a trade partner notified by the purchasing company 10 and selling company 20, and prepares a selling company/purchasing company table 34. The display control unit 33 makes public the electronic catalog registered by the selling company 20 to the purchasing company 10. Here, if the electronic catalog registered by the selling company 20 is set for each purchaser, the catalog is made public after editing for each purchasing company.

The trading system 35 comprises a transaction unit 36 and a setting management unit 37. The transaction unit 36 makes public an estimate request and a purchase request received from a purchasing company 10 to a selling company 20. In this case, the setting management unit 37 refers to the selling company/purchasing company table 34 and restricts the publication by the transaction unit 36. Specifically, for example, the estimate request and purchase request received by the purchasing company 10 are made public only to selling companies 20 selected by the purchasing company 10.

The network central system 30 comprises a user management table shown in FIG. 3, a commodity management table shown in FIG. 4, and a sales management table shown in FIG. 5.

The user management table manages correspondence between information (company ID) for identifying a company that wants to receive services provided by the network central system 30 and the user ID of the company. In this case, a user ID is, for example, a character string/numeric character string pre-determined in the network central system, a URL, an IP address s or a MAC address. A company ID is identification information assigned by the network central system 30. This user management table is updated according to an agreement made between a purchasing company or selling company and a service provider operating the network central system 30. Specifically, if a new agreement for receiving the services of an electronic purchase system is made, the record of the newly contracted company is added and if the agreement is cancelled, the record of the cancelled company is deleted.

The commodity management table is the list of commodities traded in the electronic purchase system, and manages a commodity number, item (name of commodity), standard price (desired retail price presented by a manufacturer), etc., of each commodity. Commodities managed by this table are registered, for example, by the network central system 30. However, the selling company can also register an arbitrary commodity additionally.

The sales management table manages the selling price, delivery time, etc., of each commodity offered by each selling company. This table is prepared by the registration of the selling company 20. In this case, the selling company can set the selling price and delivery time of each commodity for each purchasing company. In the example shown in FIG. 5, for example, concerning a commodity KY0000001, a selling company H567 presents "a selling price of 93 yen" and "a delivery time of 3 days" to a purchasing company K102, and presents "a selling price of 105 yen" and "a delivery time of 4 days" to a purchasing company K103.

FIG. 6 shows an example of the selling company/purchasing company table 34. This table manages available purchasing companies for each selling company and manages available selling companies for each purchasing company. Whether each trade is permitted is basically determined by a selling company or purchasing company. Information indicating whether each trade is permitted is indicated using a selling company permission flag or purchasing company permission flag in this table. Here, a "selling company permission flag" is information indicating whether a purchasing company permits a trade with a selling company, and a "purchasing company permission flag" is information indicating whether a selling company permits a trade with a purchasing company.

In the example shown in FIG. 6, for example, a selling company H700 permits trades with purchasing companies K200 and K201, and prohibits a trade with a purchasing company K202. A purchasing company K201 permits a trade with a selling company H701 and prohibits a trade with a selling company H700.

Next, the operation of the electronic purchase system of the present invention is described.

FIG. 7 is a flowchart showing the process of the network central system 30 executed when a purchasing company 10 restricts trades with selling companies. The setting management unit 32 executes the process represented by this flowchart when the purchasing company 10 calls up a process of restricting trade partners.

In step S1, the user authentication of a purchasing company 10 that has called up a process of restricting trade partners is performed. The user authentication includes a process of obtaining the user ID of the purchasing company 10 and a process of confirming the password registered in advance. If the user authentication fails, for example, an error message is displayed.

In step S2, the user management table is accessed using the obtained user ID as a key, and a corresponding company ID is obtained. Then, in step S3, the selling company/purchasing company table 34 is accessed using the company ID obtained in step S2 as a key, and a corresponding record is extracted.

In step S4, among the records extracted in step S3, a record where "Y (permitted)" is set as a "selling company permission flag" is provided to the purchasing company 10. In this case, "to provide" means to transmit data for displaying information related to the record to the purchasing company 10. In this way, the list of selling companies with which the purchasing company permits trade is displayed on a terminal of the purchasing company 10. If there is a selling company with which a trade should be prohibited in the displayed list, the purchasing company 10 notifies the setting management unit 32 of the name of that selling company.

If the name of the selling company is reported by the purchasing company 10, the "selling company permission flag" of a record corresponding to the designated selling company is modified from "Y (permitted)" to "N (not permitted)" in step S5.

In step S6, among the records extracted in step S3, a record where "N (not permitted)" is set as a "selling company permission flag" is provided to the purchasing company 10. Here, the list of selling companies with which the purchasing company 10 prohibits to trade is displayed. If there is a selling company with which the purchasing company 10 wants to trade in the list, the name of the selling company is reported to the setting management unit 32. If the name of the selling company is reported from the purchasing company 10, the "selling company permission flag" of a record corresponding to the designated selling company is modified from "N (not permitted)" to "Y (permitted)" in step S7.

FIGS. 8A–8C show examples of cases where a purchasing company 10 restricts trades with selling companies. In this example it is assumed that a purchasing company K200 calls up a process of restricting trade partners.

FIG. 8A shows an example of a record extracted in step S3. FIG. 8B shows an example of a record provided to the purchase management unit 11 of the purchasing company K200 in step S4. It is not necessary for full information related to the record to be displayed on the purchase management unit 11 of the purchasing company, and it is sufficient if only the names of the selling company are displayed. Here, if a "selling company H703" is designated as a company with which the purchasing company K200 prohibits trade, by the purchasing company K200, the "selling company permission flag" of a record assigned to the selling company H703 in the selling company/purchasing company table 34 is modified from "Y (permitted)" to "N (not permitted)". Similarly, FIG. 8C shows an example of a record provided to the purchase management unit 11 of the purchasing company K200 in step S6. In this case, if a "selling company H705" is designated as a selling company with which the purchasing company K200 wants to trade, by the purchasing company K200, the "selling company permission flag" of a record assigned to the selling company H705 is modified from "N (not permitted)" to "Y (permitted)".

FIG. 9 is a flowchart showing the process of the network central system 30 executed when a selling company restricts trades with purchasing companies. Since this process is basically the same as the process executed when a selling company restricts trades with purchasing companies, the description is omitted here.

As described above, the purchasing company 10 can select selling companies with which the purchasing company 10 wants to trade from a plurality of selling companies connected to the network central system 30. Similarly, the selling company 20 can select purchasing companies with which the selling company 20 wants to trade from a plurality of purchasing companies connected to the network central system 30.

Figure 10:
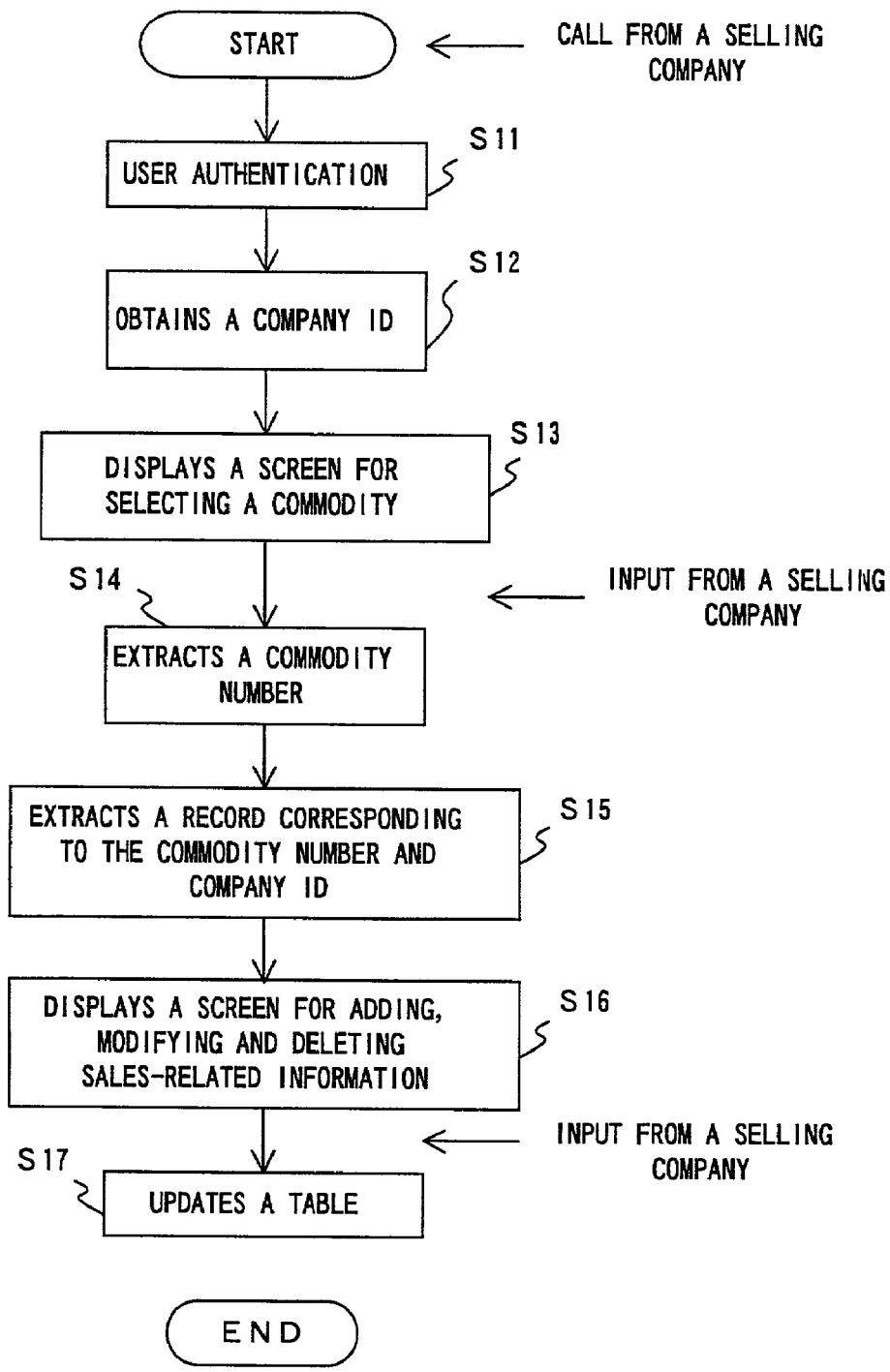
FIG. 10 is a flowchart showing the process of a network central system executed when a selling company registers sales-related information (an electronic catalog).

FIG. 10 is a flowchart showing the process of the network central system 30 executed when a selling company registers sales-related information (an electronic catalog). The setting management unit 32 executes a process represented by this flowchart when the selling company 20 calls up a process of registering an electronic catalog.

In step S11, the user authentication of a selling company 20 that has called up a process of registering an electronic catalog is performed. In step S12, the user management table is accessed using the obtained user ID as a key, and a corresponding company ID is obtained.

In step S13, a guidance screen used to select a commodity is provided. In this case, a commodity that can be selected using the guidance screen is recognized referring to the commodity management table. In this way, a commodity list used for the purchasing company 20 to set sales-related information is displayed on a terminal of the selling company 20. Then, the selling company 20 select a commodity from the commodity list, if there is a commodity for which the selling company 20 wants to set the sales-related information.

In step S14, the commodity number of a commodity selected by the selling company 20 is obtained. In step S15, the sales management table is accessed using the commodity number obtained in step S14 and company ID obtained in step S12 as keys, and a corresponding record is extracted. Then, in step S16, the record extracted in step S15 and a guidance screen used to add, modify and delete the sales-related information are provided to the selling company 20. In this way, a guidance screen used to edit (add, modify and delete) the sales management table is displayed on a terminal of the selling company.

The selling company 20 adds, modifies or deletes the sales-related information using this guidance screen (for example, executes an interactive process with the network central system 30). For example, if a purchasing company presenting a selling price, etc., is added, such a company is designated and the selling price, a delivery time, etc., are inputted. If the sales-related information is modified, the selling price, delivery time, etc., set for the purchasing company are modified. Furthermore, if the presentation of the selling price, etc., of a specific purchasing company is cancelled, the purchasing company is designated and the selling price, delivery time, etc., are deleted.

Then, if an instruction is received from the selling company 20, in step S17 the sales management table is updated according to the instruction.

FIGS. 11A–11D show examples of cases where the selling company 20 adds, modifies or deletes the sales-related information. In this example it is assumed that a selling company H567 edits the sales-related information of a commodity KY0000001.

FIG. 11A shows an example of a record extracted in step S15. FIG. 11B shows an example of a case where a purchasing company to which the sales-related information should be made public, is added. In this example, a "purchasing company K104 is added. FIG. 11C shows an example of a case where a selling price in the sales-related information is modified. In this example, the selling price presented to a purchasing company K103 is modified from "105 yen" to "100 yen". FIG. 11D shows a case where a purchasing company to which the sales-related information is offered is deleted. In this example, a "purchasing company K103" is deleted.

In this way, the selling company 20 can set sales-related information (a selling price, a delivery time, etc.) for each purchasing company.

FIG. 12 is a flowchart showing the process of the network central system 30 executed when an electronic catalog is provided to the purchasing company 10. The display control unit 33 executes a process represented by this flowchart when the purchasing company 10 calls up a process of displaying an electronic catalog.

In step S21, the user authentication of the purchasing company 10 is performed, and in step S22, the company ID of the purchasing company 10 is obtained. These processes are basically the same as those described above.

In step S23, an electronic catalog is provided to the purchasing company 10. In this way, an electronic catalog is displayed on the purchase-processing unit 12 of the purchasing company 10. However, although the electronic catalog displayed in this case includes basic information about each commodity (a standard price, physical information, etc.), it does not include sales-related information (the name of a selling company, the selling price, the delivery time, etc.). FIG. 13 shows an example of an electronic catalog displayed for the purchasing company 10 by a process executed in step S23. Here, a case where a specific commodity (in this example, a notebook the size of A4) is selected by a user (an employee) belonging to the purchasing company 20 is shown.

If the user of the purchasing company 10 requests sales-related information in response to this display, the commodity number of the selected commodity is obtained in step S24. Then, in step S25, the sales management table is accessed using the commodity number obtained in step S24 as a key, and a corresponding record is extracted.

In step S26, a record, including the company ID of the purchasing company 10 obtained in step S22 is selected from the records extracted in step S25. Then, in step S27, the selling company/purchasing company table 34 is accessed using the company ID of this purchasing company 10 as a key, and selling companies with which the purchasing company 10 permits trade, are detected. Then, a record, including the detected selling companies with which the purchasing company 10 permits trade, are selected from the records selected in step S26.

Then, instep S28, the sales-related information of a record selected in step S27 is provided to the purchasing company 10. In this way, an electronic catalog including sales-related information is displayed on the purchase processing unit 12 of the purchasing company 10. FIG. 14 shows an example of an electronic catalog displayed for the purchasing company 10 by the process in step S28.

FIGS. 15A–15D show examples of processes of generating an electronic catalog to be displayed for the purchasing company 10. In this example it is assumed that a purchasing company K102 selects a commodity KY0000001 from the electronic catalog. It is also assumed that selling companies H567 and H300 are registered in the selling company/purchasing table as selling companies with which the purchasing company K102 permits trade, although they are not shown in FIG. 15.

FIG. 15A shows a sales management table. FIG. 15B shows a record extracted from the sales management table using the commodity KY0000001 as a key. Furthermore, FIG. 15C shows a record selected using the purchasing company K102 as a key in the state shown in FIG. 15B. Then, FIG. 15D shows a record obtained by eliminating records other than the selling companies H567 and H300 in the state shown in FIG. 15C.

Then, the sales-related information (selling price, delivery time, etc.) of the records shown in FIG. 15D is provided to the purchasing company K102. In this way, an electronic catalog, including sales-related information is provided and displayed for the purchasing company K102.

In this way, according to the electronic purchase system in this embodiment, when a purchasing company designates a commodity, the sales-related information of the commodity set by each selling company is displayed. In this case, the sales-related information of only selling companies with which the purchasing company permits trade, is displayed. In other words, the sales-related information of selling companies with which the purchasing company prohibits to trade is not displayed. Therefore, each employee of a purchasing company cannot purchase any commodity from a selling company with which the purchasing company prohibits to trade.

The purchasing company 10 can purchase a commodity using a displayed electronic catalog. For example, in the displayed catalog shown in FIG. 14, a purchase request is issued to the transaction unit 36 of the network central system 30 by selecting a selling company using a pointing device, etc., and by further inputting necessary information, such as the quantity of a purchase, etc. Then, on receipt of the purchase request, the network central system 30 writes the purchase request in a storage area for a selling company designated in the purchase request. In this way, when the selling company receives the purchase request or obtains the purchase request by accessing the network central system 30, the commodity is delivered to the purchasing company according to the request. Since a method of collecting the purchase price is not directly related to the present invention, the description is omitted here.

According to this electronic purchase system, as described above, sales-related information about each commodity traded via the network central system 30 is arbitrarily set by each selling company. Thus, sales-related information is not set for all commodities. Therefore, if a purchasing company 10 selects a desired commodity from an electronic catalog, sometimes a selling price, etc., is not set for the commodity. Even if the selling price, etc., is set for the commodity, it cannot always satisfy the purchasing company. Therefore, this electronic purchase system is provided with a function for transmitting an estimate request from a purchasing company to a selling company.

Figure 16:
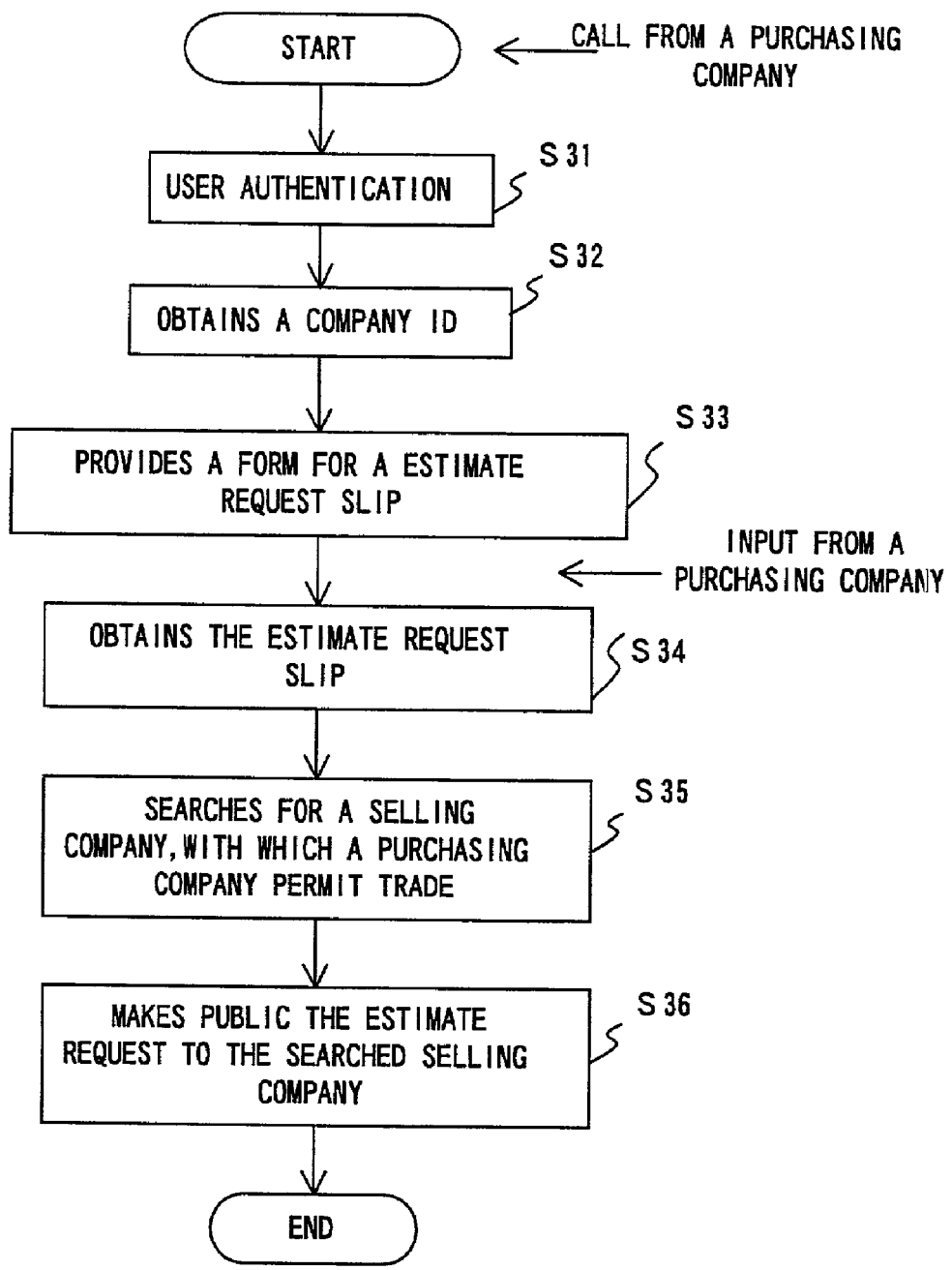
FIG. 16 is a flowchart showing the process of a network central system executed when an estimate request is issued.

FIG. 16 is a flowchart showing the process of the network central system when an estimate request is issued. The process of this flowchart is executed by the transaction unit 36 when a purchasing company 10 calls up a process of issuing a estimate request.

In step S31, the user authentication of the purchasing company 10 is executed, and in step S32, the company ID of the purchasing company 10 is obtained. These processes are basically the same as those described above.

In step S33, a form used to prepare an estimate request is provided to the purchasing company 10. In this way, the form used to prepare an estimate request is displayed on the purchase processing unit 12 of the purchasing company 10. Then, an employee of the purchasing company 10 prepares an estimate request slip using the form. FIG. 17A shows an example of the estimate request slip.

In step S34, the estimate request slip prepared by the purchasing company 10 is obtained. In step S35, the selling company/purchasing company table is accessed using the company ID of the purchasing company 10 obtained in step S32 as a key, and selling companies with which the purchasing company 10 permits trade are searched for. Then, in step S36, the estimate request slip is made public only to the searched selling companies. Specifically, the estimate request slip is written in an area where selling company searched for in step S35 can access.

On receipt of the estimate request, the selling company prepares a reply to the request (estimate reply slip) and transmits the reply to the network central system 30. FIG. 16B shows an example of the estimate reply slip.

On receipt of the estimate reply slip from the selling company, the network central system 30 makes public the slip to the purchasing company 10. Specifically, the estimate reply slip is written in an area where the purchasing company 10 can access. In this way, the purchasing company 10 can obtain the reply.

In this way, according to the electronic purchase system in this embodiment, if a purchasing company issues a estimate request, the request is made public only to selling companies with which the purchasing company permits trade. Therefore, the purchasing company can receive estimate replies only from her desired selling companies.

Although in the above embodiment, the purchasing company 10 issues an estimate request, the purchasing company can also issue a purchase request, including a desired selling price or desired delivery time instead of the estimate request. FIG. 18 shows an example of a purchase request slip. In this case, this purchase request is made public only to selling companies with which the purchasing company 10 permits trade. Then, on receipt of this purchase request, each selling company notifies the network central system 30 of a reply to the request.

In the above embodiment, an estimate request or a purchase request is transmitted to selling companies with which the purchasing company issuing the request permits trade. In addition to that, the network central system 30 can be configured not to transmit the request to a selling company which does not permits trade with the purchasing company.

Since the "place" is interacted by a plurality of selling companies and a plurality of purchasing companies, the sales amount of each commodity becomes large as a whole, even if there is a small amount of trade for each company and there are many kinds of commodities involved in the trade. Therefore, in such a case, it seems that a selling company can offer a cheaper price and thereby can expand business potential. The purchasing company can purchase a commodity at lower costs than a case where the purchasing company trades with the selling company individually.

Furthermore, in the trade environment described above, a purchasing company can restrict selling companies. Therefore, for example, each employee of the purchasing company can be prevented from purchasing a commodity from a company other than companies designated by the manager of the purchasing company. In addition, a selling company can also restrict purchasing companies. Therefore, for example, a selling company can be prevented from trading with a purchasing company that does not pay a purchase price punctually.

Although in the above embodiment, each employee of an enterprise purchases indirect materials, such as stationery, that do not directly contribute to the profits of the enterprise, etc., the present invention is not limited to this. The electronic purchase system of the present invention can provide the same services, for example, for direct materials, such as materials that directly contribute to the profits of the enterprise, are purchased. The same services can be provided not only to a trade between enterprises, but also to trade between an enterprise and an individual or a trade between individuals.

Furthermore, although in the above embodiment, information about a trading partner, a selling price, etc., is registered by a selling company or purchasing company, the present invention is not limited to this. According to the electronic purchase system of the present invention, the network central system 30 can also modify the information. Several such examples are described below.

Figure 19:
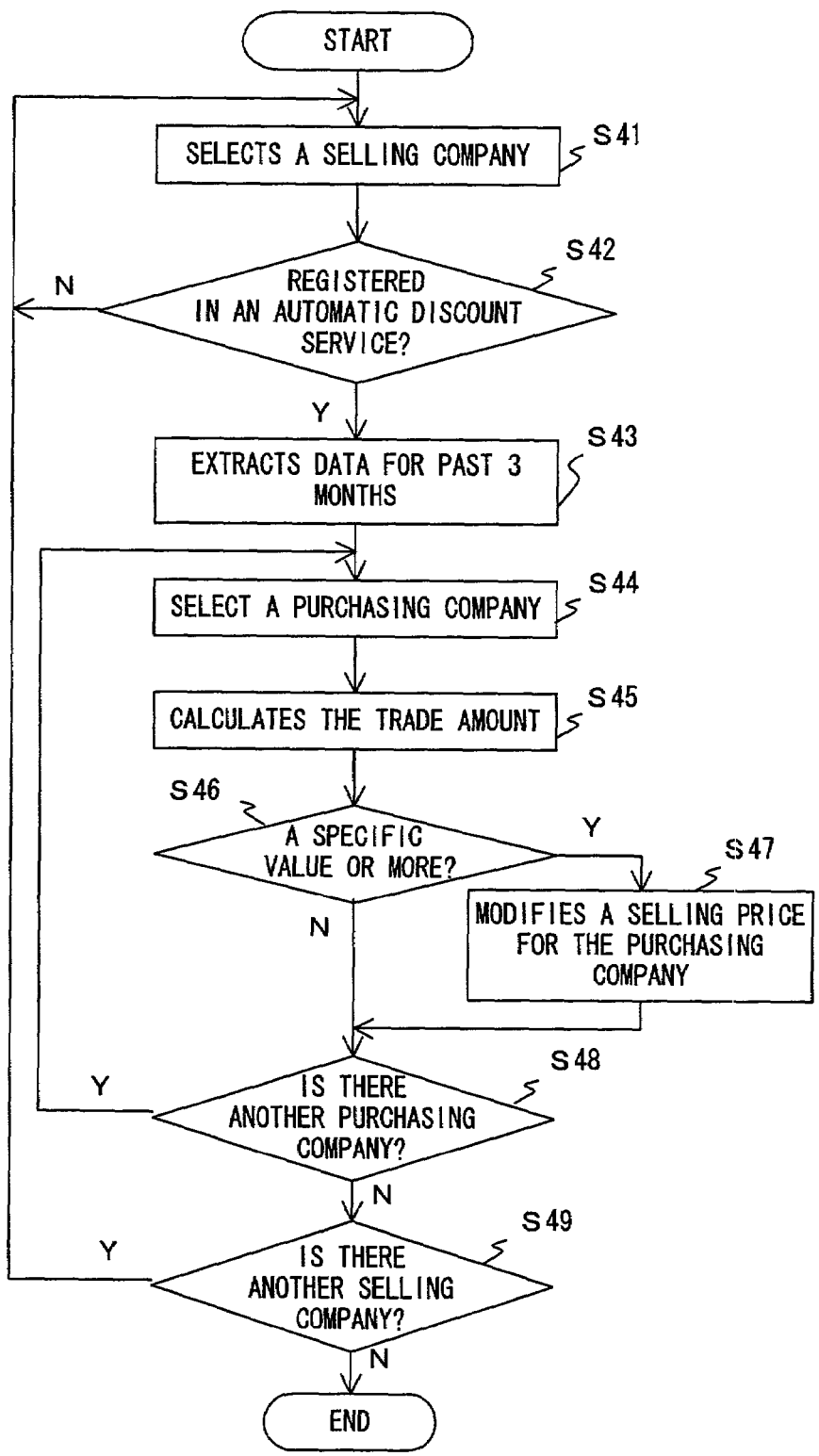
FIG. 19 is a flowchart showing the operation of a network central system to provide the service of modifying a selling price based on a trade amount.

FIG. 19 is a flowchart showing the operation of the network central system 30 for providing a service to automatically modifying a selling price based on a trade amount. It is assumed that the process represented by this flowchart is regularly (for example, once a month) executed by the setting management unit 32. The network central system 30 stores information about all trades using this electronic purchase system. FIG. 20 shows an example of a trade log table storing such information.

In this embodiment, a selling price for a purchasing company with a specific trade amount or more is automatically discounted. Whether this kind of service is accepted is registered in advance for each selling company. This is described in detail below.

In step S41, one selling company is selected from the user management table. In step s42, it is checked whether the selected selling company is registered as a company provided with an "automatic discount service". If the selling company is registered as such, the flow proceeds to step S43. If the selling company is not registered as such, the flow returns to step S41 and a subsequent selling company is selected.

In step S43, the trade log table shown in FIG. 20 is accessed using the company ID of the selling company selected in step S41, and trade data for past three months are extracted. In step S44, one purchasing company is selected from the user management table. Then, in step S45, only data about the purchasing company selected in step S44 are extracted from the trade data extracted in step S43, and the total or average trade amount is calculated.

In step S46 it is checked whether the trade amount calculated in step S45 exceeds a predetermined specific value. If the trade amount exceeds the specific value, in step S47 a selling price is discounted for the purchasing company. Specifically, a selling price set in the sales management table is updated. If the trade amount is less than the specific value, step S47 is skipped.

Step S48 is provided to execute the processes in steps S45–S47 for all purchasing companies. Step S49 is provided to execute the processes in steps S42–S48 for all selling companies.

In this way, if the service of this embodiment is introduced, a selling price is automatically discounted for a purchasing company purchasing a large amount of commodities. In this way, a service close to one in the real world can be provided. In addition, if this method is applied, a selling price can also be automatically raised for a purchasing company with a small trade amount or trade with such a purchasing company can also be stopped. Alternatively, trade with a purchasing company that does not pay purchase prices punctually, can be automatically stopped.

In this embodiment, an amount to be discounted from a current trade price can be modified based on the trade amount calculated in step S45 or the discount amount can be adjusted in proportion to the trade amount. Alternatively, the amount to be discounted from the current trade price can be left constant, regardless of the trade amount calculated in step S45.

Furthermore, although in steps S43–S45 of this embodiment, the total or average trade amount between a purchasing company and a selling company being a current trade partner for a past specific period is calculated, this can also be replace with the total or average trade amount of a purchasing company with all selling companies for a past specific period.

Furthermore, a selling company can be eliminated from his/her trade targets by almost the same procedure as that of the process shown in the flowchart shown in FIG. 19. FIG. 21 is a flowchart showing such a process.

Figure 22:
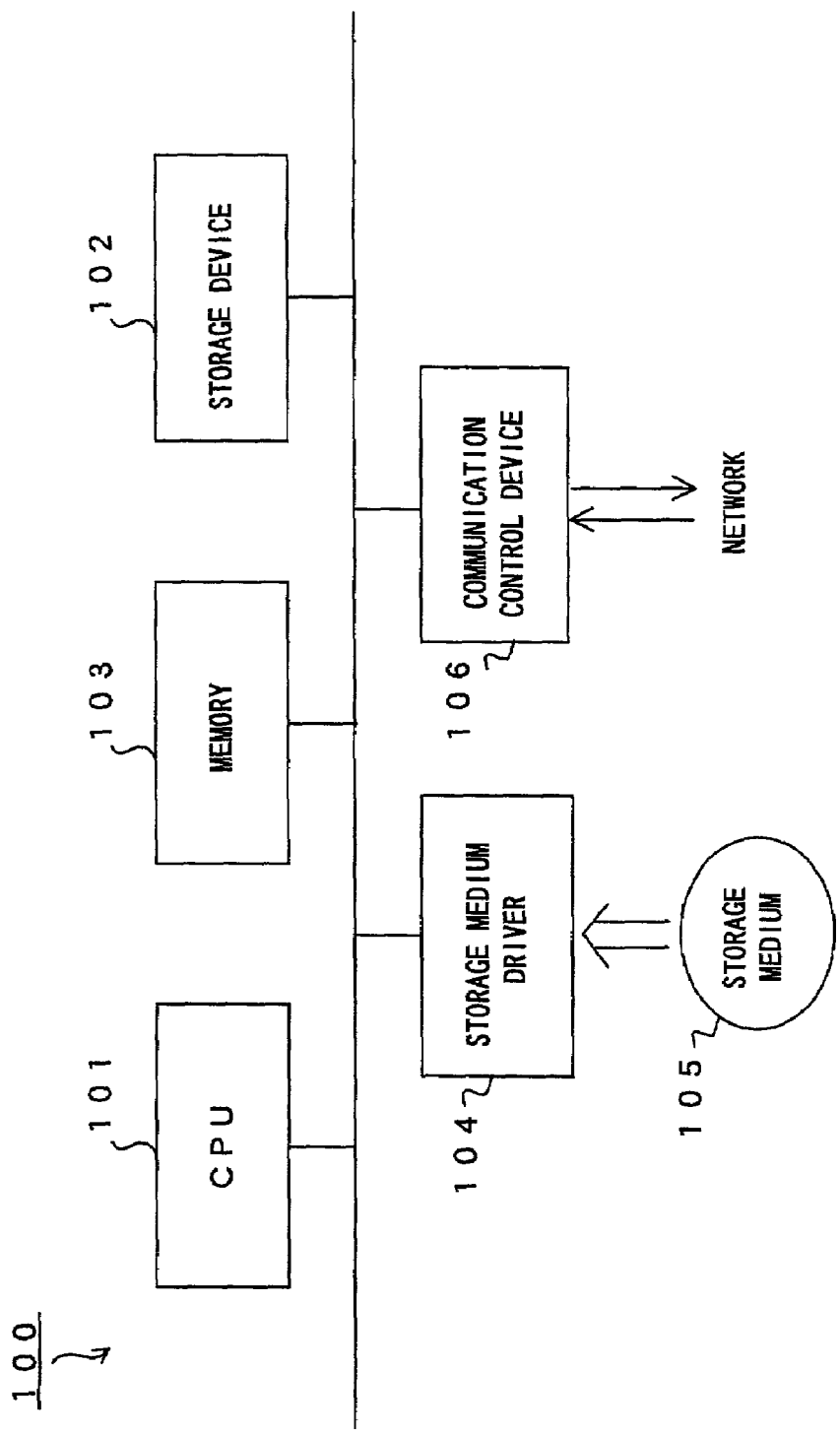
FIG. 22 shows the configuration of a computer that performs a program describing the functions of the present invention.

A function to provide the electronic purchase service described above can be obtained by a computer to execute a program describing the processes shown in the flowcharts. FIG. 22 shows the configuration of a computer 100 for executing those programs.

A CPU (central processing unit) 101 executes the programs describing the processes shown in the flowcharts by loading them into a memory 103 from a storage device 102. For the storage device 102, for example, a hard disk is used, and it stores the programs described above. For the memory 103, for example, a semiconductor memory is used and is used as the work area of the CPU 101.

A storage medium driver 104 accesses a portable storage medium 105 according to the instruction of the CPU 101. The portable storage medium 105 includes, for example, a semiconductor device, such as PC card, etc., a medium to/from which information is inputted/outputted by a magnetic function, such as a floppy disk, a magnetic tape, etc., and a medium to/from which information is inputted/outputted, such as an optical disk, etc. A communication control device 106 transmits/receives data to/from a network according to the instruction of the CPU 101.

Figure 23:
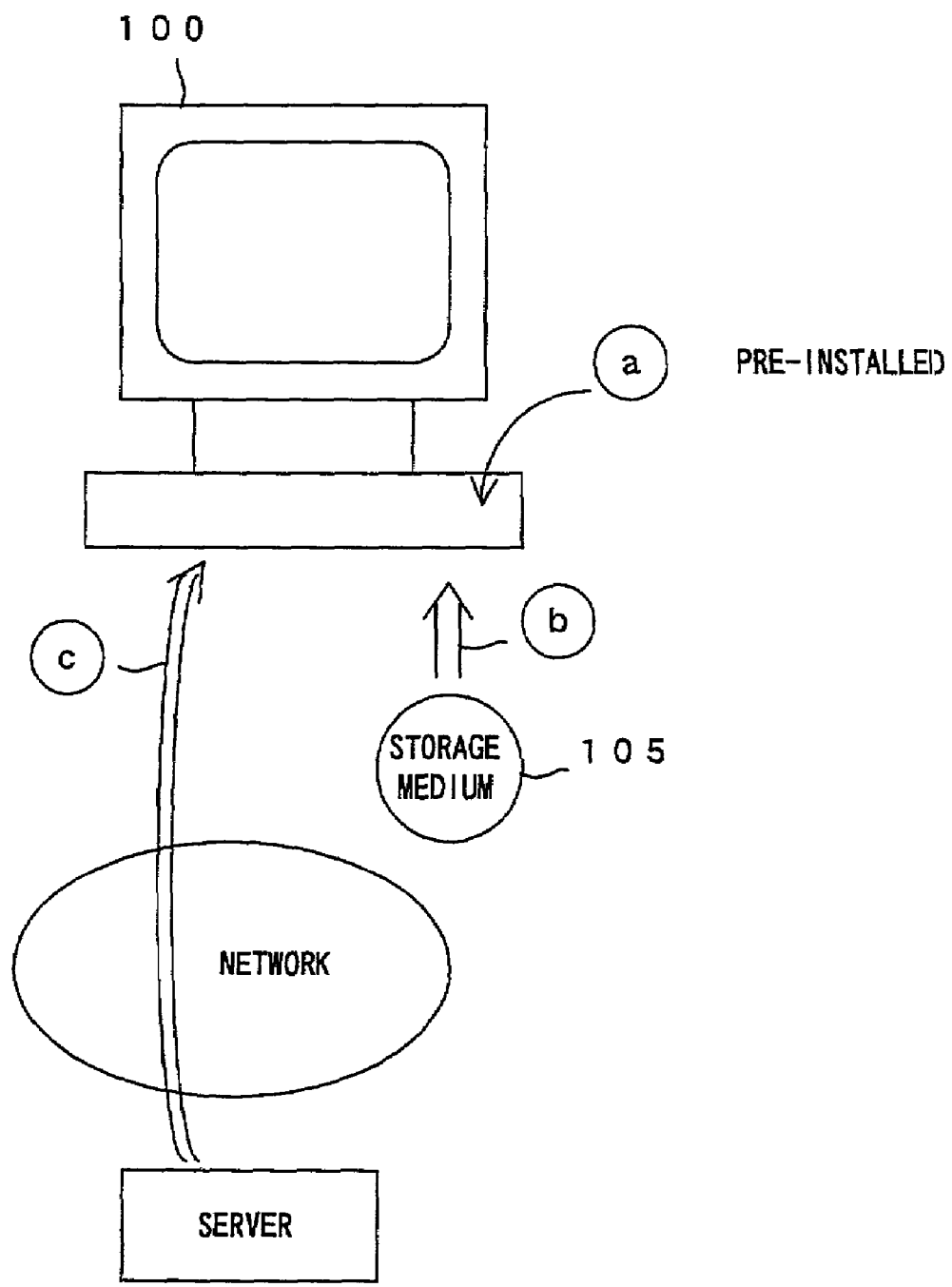
FIG. 23 shows how to provide the software programs of the present invention.

FIG. 23 shows how to provide a software program, etc., related to the present invention. The program related to the present invention is provided by an arbitrary one of the following three methods.

(a) The program, etc., is installed in the computer 100 and is provided. In this case, the program, etc., is pre-installed prior to shipment.

(b) The program, etc., is stored in a portable storage medium and is provided. In this case, the program, etc., stored in the portable storage medium 105 is basically installed in the storage device 102 via the storage medium driver 104.

(c) The program, etc., is provided from a server located in a network. In this case, the computer basically obtains the program, etc., by downloading the program, etc., stored in the server.

According to the electronic purchase of the present invention, when a purchaser purchases a commodity, the sales-related information of only selling companies registered in advance by the purchaser is provided. Therefore, the number of trade partners is prevented from expanding endlessly. A seller can eliminate a specific trade partner from his/her trade targets. Furthermore, a seller can set the selling price of each commodity for each purchaser in a place where a plurality of sellers and a plurality of purchasers interact.

What is claimed is:

1. An electronic purchase system for providing a site where a plurality of sellers and a plurality of purchasers participate, comprising:
   a storage unit storing sales-related information about commodities that the sellers offer, the sales-related information defining for each commodity that at least one seller offers, at least one target purchaser of each of the at least one seller and respective sales conditions;
   a purchaser registration unit registering a permission flag indicating, for each of the purchasers, whether each seller permits a trade therewith;
   a publication unit making the sales-related information for each commodity public to any of the purchasers only if the permission flag corresponding to each information receiving purchaser indicates that the at least one seller of the commodity permits the trade therewith; and
   a management unit recording a trade amount for each of the purchasers and updating the permission flag to reject trades with each restricted purchaser when the trade amount corresponding thereto for a past period is less than a predetermined threshold,
   wherein when a prospective purchaser selects an offered commodity from an electronic catalog, said publication unit accesses said storage unit to generate first information corresponding to the offered commodity, extracts second information corresponding to the prospective purchaser from the first information, generates from the second information third information corresponding to each seller for which the permission flag indicates permission to trade with the prospective purchaser, and provides the third information to the prospective purchaser.

2. The electronic purchase system according to claim 1, wherein the sales-related information is selected for each purchaser company by each seller.

3. The electronic purchase system according to claim 1, wherein information registered in said purchaser registration unit is updated based on a trade between each seller and each purchaser.

4. The electronic purchase system according to claim 1, wherein the electronic purchase system further comprises a discount unit discounting a trade price for a current trade if a total or average trade amount of at least one purchaser for a past specific period for at least one of the sellers exceeds a specific value, when the at least one purchaser purchases a commodity from the seller.

5. An electronic purchase system for providing a site where a seller and a plurality of purchasers participate, comprising:
   a storage unit storing sales-related information about a commodity that the seller offers and is individually selected for at least one of the purchasers and a permission flag indicating, for each of the at least one purchaser, whether the seller permits a trade therewith;

a management unit recording a trade amount for each of the purchasers and updating the permission flag to reject trades with each restricted purchaser when the trade amount corresponding thereto for a past period is less than a predetermined threshold; and a publication unit making public the sales-related information to any of the purchasers only if the permission flag corresponding to each information receiving purchaser indicates that the seller permits the trade therewith, wherein when a prospective purchaser selects an offered commodity from an electronic catalog, said publication unit accesses said storage unit to generate first information corresponding to the offered commodity, extracts second information corresponding to the prospective purchaser from the first information, generates from the second information third information corresponding to each seller for which the permission flap indicates permission to trade with the prospective purchaser, and provides the third information to the prospective purchaser.

6. The electronic purchase system according to claim 5, wherein the sales-related information is updated based on a trade between the seller and each purchaser.

7. An electronic purchase method for providing a site where a seller and a plurality of purchasers participate, comprising:

inputting sales-related information about a commodity that the seller offers;

registering a permission flag indicating, for each of the purchasers, whether the seller permits a trade therewith, according to an instruction from the seller;

making public the sales-related information to any of the registered purchasers only if the permission flag corresponding to each information receiving purchaser indicates that the seller permits the trade therewith;

recording a trade amount for each of the purchasers;

updating the permission flag to reject trades with each restricted purchaser when the trade amount corresponding thereto for a past period is less than a predetermined threshold, generating first information corresponding to the offered commodity, when a prospective purchaser selects an offered commodity from an electronic catalog;

extracting second information corresponding to the prospective purchaser from the first information;

generating from the second information third information corresponding to each seller for which the permission flag indicates permission to trade with the prospective purchaser; and providing the third information to the prospective purchaser.

8. An electronic purchase method for providing a site where a seller and a plurality of purchasers participate, comprising:

inputting sales-related information about a commodity that the seller offers and is individually selected for at least one of the purchasers;

registering a permission flag indicating, for each of the at least one purchaser, whether the seller permits a trade therewith;

recording a trade amount for each of the purchasers; and updating the permission flag to reject trades with each restricted purchaser when the trade amount corresponding thereto for a past period is less than a predetermined threshold;

generating first information corresponding to the offered commodity, when a prospective purchaser selects an offered commodity from an electronic catalog;

extracting second information corresponding to the prospective purchaser from the first information;

generating from the second information third information corresponding to each seller for which the permission flag indicates permission to trade with the prospective purchaser; and providing the third information to the prospective purchaser; and making public the sales-related information to any of the purchasers only if the permission flag corresponding to each information receiving purchaser indicates that the seller permits the trade therewith.

9. A storage medium storing a program executed by a computer to perform a method comprising:

providing a site where a seller and a plurality of purchasers participate;

receiving sales-related information about a commodity that the seller offers;

registering a permission flag indicating, for each of the purchasers, whether the seller permits a trade therewith, according to an instruction from the seller; and making public the sales-related information to any of the registered purchasers only if the permission flag corresponding to each information receiving purchaser indicates that the seller permits the trade therewith;

recording a trade amount for each of the purchasers;

updating the permission flag to reject trades with each restricted purchaser when the trade amount corresponding thereto for a past period is less than a predetermined threshold, generating first information corresponding to the offered commodity, when a prospective purchaser selects an offered commodity from an electronic catalog;

extracting second information corresponding to the prospective purchaser from the first information;

generating from the second information third information corresponding to each seller for which the permission flag indicates permission to trade with the prospective purchaser; and providing the third information to the prospective purchaser.

10. A storage medium storing a program executed by a computer to perform a method comprising:

providing a site where a seller and a plurality of purchasers participate;

receiving sales-related information about a commodity that the seller offers and is individually selected for at least one of the purchasers from the seller; and registering a permission flag indicating, for each of the at least one purchaser, whether the seller permits a trade therewith;

recording a trade amount for each of the purchasers;

updating the permission flag to reject trades with each restricted purchaser when the trade amount corresponding thereto for a past period is less than a predetermined threshold;

generating first information corresponding to the offered commodity, when a prospective purchaser selects an offered commodity from an electronic catalog;

extracting second information corresponding to the prospective purchaser from the first information;

generating from the second information third information corresponding to each seller for which the permission flap indicates permission to trade with the prospective purchaser; and providing the third information to the prospective purchaser; and making public the sales-related information to any of the purchasers only if the permission flag corresponding to each information receiving purchaser indicates that the seller permits the trade therewith.

* * * * *

UNITED STATES PATENT AND TRADEMARK OFFICE
CERTIFICATE OF CORRECTION

| | | |
|---|---|---|
| PATENT NO. | : 7,051,000 B2 | Page 1 of 1 |
| APPLICATION NO. | : 09/729950 | |
| DATED | : May 23, 2006 | |
| INVENTOR(S) | : Michiteru Kodama et al. | |

It is certified that error appears in the above-identified patent and that said Letters Patent is hereby corrected as shown below:

Title Page    [56] References Cited
OTHER PUBLICATIONS
After "v70n6" insert --,--;

Column 16    line 8 (claim 10) delete "flap" and insert "flag".

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,051,000 B2 |
| APPLICATION NO. | : 09/729950 |
| DATED | : May 23, 2006 |
| INVENTOR(S) | : Michiteru Kodama et al. |

It is certified that error appears in the above-identified patent and that said Letters Patent is hereby corrected as shown below:

Column 15, Line 20, after "permission" change "flap" to --flag--.

Column 17, Line 8, change "flap" to --flag--.

Signed and Sealed this

Twenty-seventh Day of March, 2007

JON W. DUDAS
*Director of the United States Patent and Trademark Office*